UNITED STATES PATENT OFFICE.

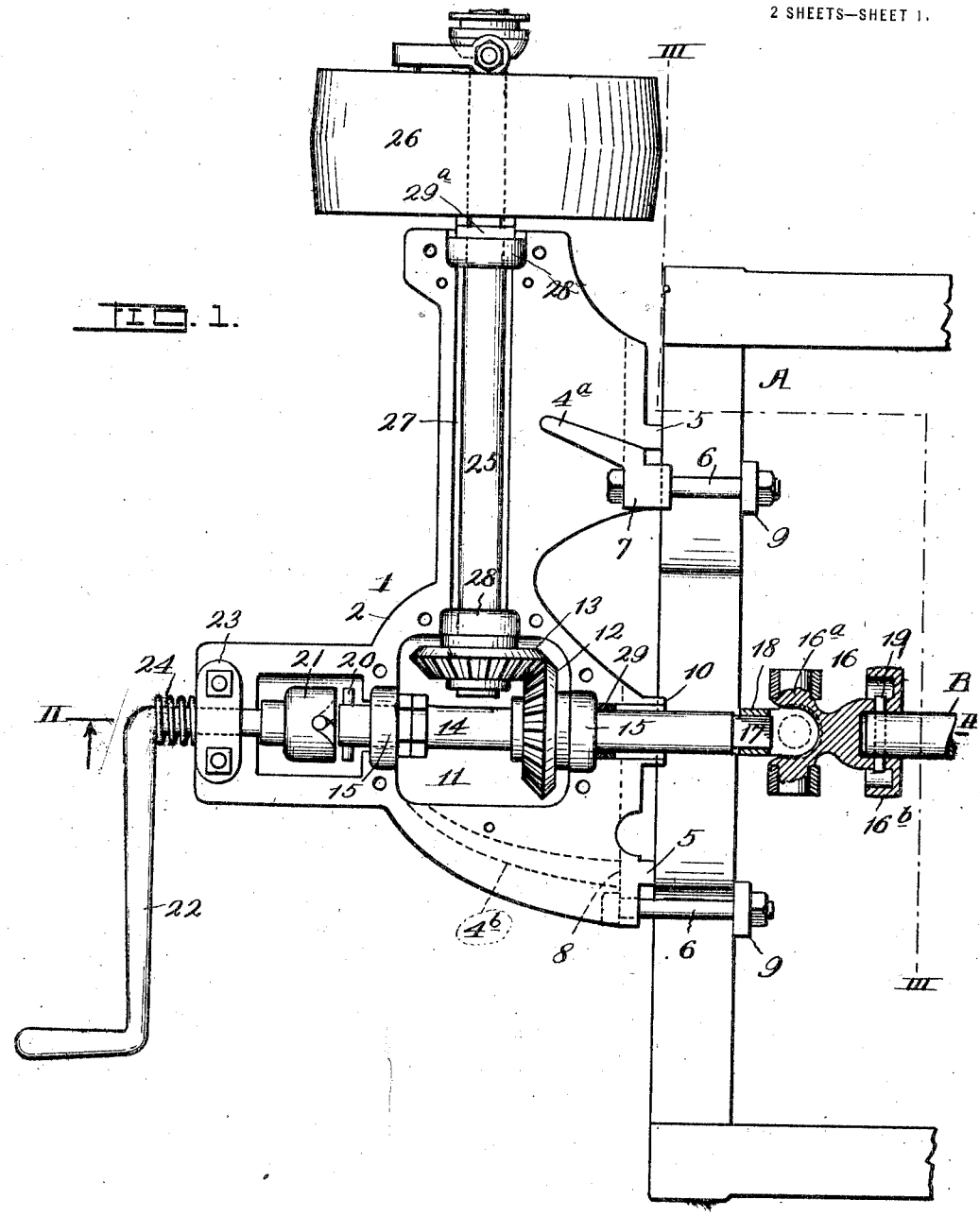

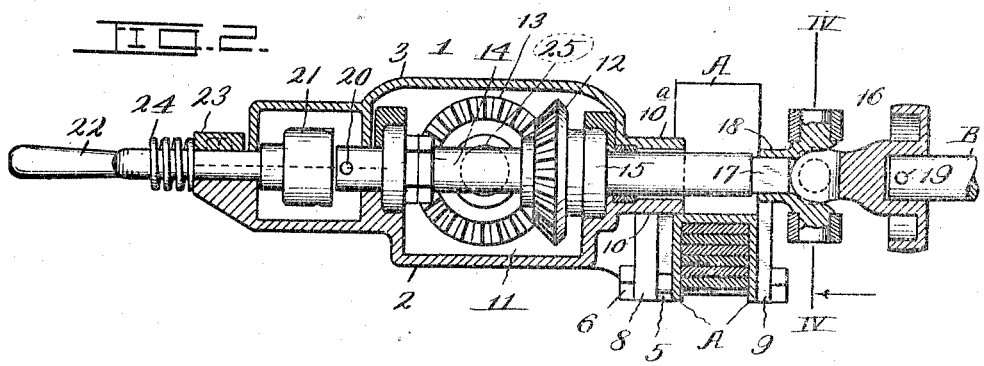
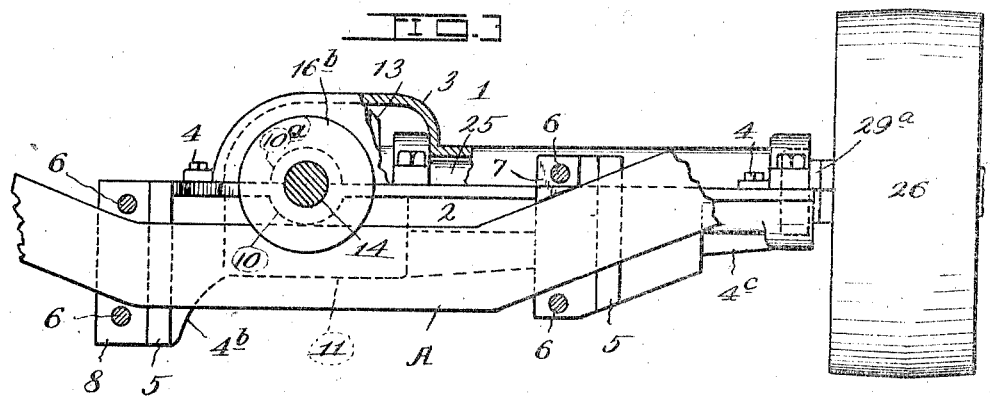
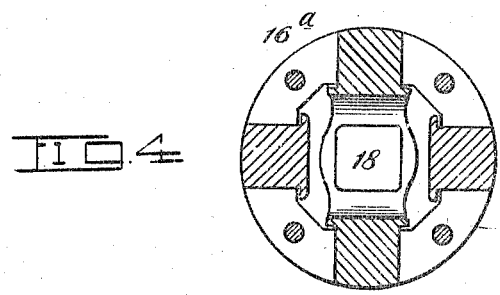

ELI A. BASEL, OF KANSAS CITY, MISSOURI.

AUTO POWER-TRANSMISSION ATTACHMENT.

1,316,529.   Specification of Letters Patent.   Patented Sept. 16, 1919.

Application filed December 18, 1915. Serial No. 67,494.

*To all whom it may concern:*

Be it known that I, ELI A. BASEL, a citizen of the United States, residing at Kansas City, in the county of Jackson and State of Missouri, have invented certain new and useful Improvements in Auto Power-Transmission Attachments, of which the following is a specification.

My invention relates to improvements in power transmission attachments for automobiles, and one object is to provide an attachment of this character which will enable the motor of an automobile to be utilized as a stationary engine in running light machinery of different kinds.

A further object is to provide an attachment which can be readily applied to an automobile without making alterations in the same, and which after being installed can be left permanently in place, so that it will always be ready for use.

Another object is to provide an attachment of simple, durable and inexpensive construction, and one which does not require that the wheels of the automobile be jacked up off the ground preparatory to using it as a stationary engine.

Other objects of the invention will hereinafter appear, and in order that said invention may be fully understood, reference will now be made to the accompanying drawings, in which:

Figure 1 is a broken plan view of the front portion of an automobile equipped with my power transmission device.

Fig. 2 is a section on line II—II of Fig. 1.

Fig. 3 is an irregular broken section on line III—III of Fig. 1.

Fig. 4 is an enlarged section on line IV—IV of Fig. 2, of a universal joint employed in carrying out the invention.

A designates the front portion of an automobile chassis to which my device is secured, and B the crank shaft of the motor (not shown). The foregoing are of the Ford type, although it is to be understood that my attachment may be adapted to other types of automobiles without departing from the spirit or scope of the invention.

In carrying out my invention, I employ a case 1 consisting of a lower section 2 and a cap or upper section 3, which latter is secured to the former by bolts 4. Said case is reinforced with suitable ribs 4ª, 4ᵇ and 4ᶜ.

The lower section 2 of the case is provided at its rear sides with two vertically arranged alinement lugs 5, firmly held against the front bar of the chassis A by bolts 6 passing through lugs 7 and 8 and short vertical bars 9. The lugs 7 and 8 are formed integral with the lower section 2. The bolts 6 are relieved of shearing stress by the lug 7 and a semi-tubular extension 10, which rest upon the upper surface of the bar A, as disclosed by Figs. 1 and 2. The lug 7 and the extension 10 are spaced apart to overcome any tendency of the case 1 to rock in a vertical plane, and said lug 7 has an inclined surface to fit the adjacent inclined surface of the front bar of the chassis A and prevent creeping of the case 1 toward the adjacent end of said front bar.

The case 1 has a gear chamber 11 to receive intermeshing bevel gears 12 and 13. The bevel gear 12 is fixedly-mounted upon a shaft 14 journaled in thrust bearings 15, seated in the case 1. The shaft 14 is yieldably-connected at its rear end to the motor shaft B, by an element 16 embodying a universal coupling 16ª and a fan pulley 16ᵇ, so that should it get out of alinement with said motor shaft B it will not cramp or bind in its bearings 15. The rear end 17 of the shaft 14 is rectangular in form and slidably fits a socket 18 in the joint 16ª, so that should the shaft B move forward slightly it cannot exert end thrust upon the shaft 14. The fan pulley end of the member 16 is secured to the motor shaft B in any suitable manner, a transverse pin 19 being shown for that purpose.

The forward end of the shaft 14 has a transverse pin 20 extending therethrough for engagement with a ratchet clutch 21, formed at the rear end of a crank 22 retained in its bearing in the front end of the case 1 by a cap 23. A coil spring 24 is interposed between the forward end of the case 1 and the bent portion of the crank 22 to normally hold the same in advanced position, so that its clutch 21 will not engage the pin 20 except when said crank is pushed inwardly against the action of the spring 24 preparatory to cranking the motor. The crank 22, the cap 23, and the spring 24 may be the parts originally installed on the car for cranking the motor, but when my attachment is applied said parts are removed from their support on the front bar of the chassis A and placed at the forward portion of the case 1, as shown.

The bevel gear 13 is fixedly-mounted upon one end of a driven shaft 25 provided at its opposite end with a pulley 26, whereby power may be transmitted to light machinery of different descriptions through the intermediacy of a belt, not shown. The pulley 26 is, preferably, of the clutch type, so that it can be thrown out of gear with the shaft 25 and remain idle while the motor is being cranked. Said pulley may also be removably mounted upon the shaft 25, so that other pulleys of different sizes can be readily substituted when desired, or it may have removable peripheries of different diameters to transmit different speeds to the belt.

The shaft 25 extends through a channel 27 in the case 1 and is journaled in thrust bearings 28 seated in said case. Bearings 15 and 28, are preferably, of the ball-bearing type to reduce the friction between them and their respective shafts to a minimum. Said bearings 15 and 28 are supplied with a lubricant originally placed in the chamber 11, and a portion of which is free to flow through the channel 27 to supply the bearings 28. Said lubricant is prevented from escaping through the tubular extensions 10 and 10ᵃ on the lower and upper sections 2 and 3, respectively, of the case 1 by gaskets 29 placed within said extensions at the rear of the rearmost bearing 15, and is prevented from escaping through the outer end of the channel 27 by a gasket 29ᵃ.

As disclosed by Fig. 1, the pulley 26 is arranged to one side of the chassis, which position leaves ample clearance between it and the ajacent front wheel (not shown) of the automobile, so that said wheel will not be in the way of applying a belt to or removing it from, the pulley 26.

As the operation is apparent from a glance at Fig. 1 it is deemed sufficient to state that the motor is cranked by pushing the crank 22 inward until the notched portion of its clutch 21 engages the pin 20, then rotating said crank to rotate the motor shaft B through the intermediacy of the shaft 14 and the member 16. Upon the motor starting under its own power, it continues to rotate its shaft B, which, through the intermediacy of the member 16 turns the shaft 14 and forces the clutch 21 out of engagement with the pin 20. As the shaft 14 is driven from the motor, it in turn drives the shaft 25 through the intermediacy of the bevel gears 12 and 13, and said shaft 25 drives the pulley 26 from which the power is transmitted to the point of use. When the automobile is to be used for traveling on the road none of the parts of the attachment need be removed as they in no way interfere with the working parts of the automobile.

From the foregoing description, it is apparent that I have produced an attachment possessing all the features above enumerated, and while I have shown and described the preferred form of my invention, I reserve the right to make such changes in the construction, proportions and arrangement of parts as properly fall within the spirit and scope of the claims.

Having thus described my invention, what I claim and desire to secure by Letters Patent, is:

1. The combination with an automobile; of a support secured to the forward portion of said automobile, a shaft mounted in said support, a universal joint connecting said shaft to the motor shaft of the automobile, a second shaft mounted in the support at an angle to the first shaft, means on said shafts for transmitting power from the first shaft to the second shaft, and a belt pulley on said second shaft.

2. The combination with an automobile; of a support secured to the forward portion of said automobile, a shaft mounted in said support, a combination universal coupling and fan pulley flexibly connecting said shaft to the motor shaft of the automobile, a second shaft mounted in the support at an angle to the first shaft, means on said shafts for transmitting power from the first shaft to the second shaft, and a pulley mounted on said second shaft.

3. The combination with an automobile, of a case secured to the forward portion of said automobile and having a gear chamber therein, a shaft journaled in said case and operably connected to the motor shaft of the automobile, a second shaft journaled in said case at an angle to said first shaft, gear wheels arranged in the gear chamber and mounted on said first and second shafts in meshed relation for driving the latter shaft from the former, manual means for starting said first shaft, and a belt pulley mounted on the outer end of said second shaft.

4. The combination with an automobile; a case secured to the forward portion of said automobile and having a gear chamber therein, a shaft journaled in said case and operably-connected to the motor shaft of the automobile, a second shaft journaled in the case, gear wheels arranged in the gear chamber and mounted on the first and second shafts whereby the former can drive the latter, and power transmitting means mounted on said second shaft.

5. The combination with an automobile; of a case having a gear chamber and alining lugs which latter abut the frame of the automobile, means on said case to overlap the front of said frame, means for connecting said case to the frame, a shaft journaled in the case and operably-connected to the motor shaft of the automobile, a second shaft journaled in the case and arranged at an angle to the first shaft, gears in the gear case and mounted on the first and second shafts so that the former can drive the latter, manual means for starting the first shaft, and a pulley mounted on the second shaft.

6. The combination with an automobile, of a housing having alining means engaging the frame of the automobile and also provided with engaging means overlapping the front of said frame, a power communicating device mounted in said housing and operably connected to the motor shaft of the automobile, and means for securing said housing to said frame of the automobile.

7. The combination with an automobile having a frame including a forward transverse member having a laterally inclined portion, of a housing having alining means engaging said frame and provided with a lug embracing said inclined portion of said transverse frame member for preventing lateral shifting of the housing, a power communicating device mounted in said housing and operably connected to the motor shaft of the automobile, and means for securing said housing to said frame of the automobile.

8. An automobile power attachment comprising supporting means adapted to be detachably secured to the front portion of the automobile, shafts geared together and journaled in said supporting means at an angle to each other, and intermediate means for driving one of said shafts from the automobile motor, said intermediate driving means having a floating connection with the motor shaft.

9. An automobile power attachment comprising supporting means adapted to be detachably secured to the front portion of the automobile, shafts geared together and journaled in said supporting means at an angle to each other, and an intermediate flexible drive connection between one of said shafts and the motor shaft of the automobile for transmitting power from the latter.

10. An automobile power attachment comprising supporting means adapted to be detachably secured to the front portion of the automobile, a pair of shafts journaled in said supporting means at an angle to each other, gears carried by said shafts in mesh with each other, and means for driving one of said shafts from the automobile motor, said supporting means being provided with a pair of bearings for said last mentioned shaft for journaling the latter upon opposite sides of the gear carried thereby.

11. An automobile power attachment comprising supporting means adapted to be detachably secured to the front portion of the automobile, a pair of shafts journaled in said supporting means at an angle to each other with one of said shafts geared to the other at a point intermediate the ends of the latter, said supporting means being provided with bearings for both the end portions of said latter shaft, means connected with one end of said later shaft for transmitting power thereto from the automobile motor, and starting means removably connected with the other end of said latter shaft.

In testimony whereof I affix my signature, in the presence of two witnesses.

ELI A. BASEL.

Witnesses:
  L. J. FISCHER,
  F. C. FISCHER.